July 15, 1958

L. B. SCOTT 2,843,822

PRECISION TRANSDUCER

Filed Sept. 15, 1953

INVENTOR
Larkin B. Scott
BY
ATTORNEYS

July 15, 1958    L. B. SCOTT    2,843,822
PRECISION TRANSDUCER
Filed Sept. 15, 1953    3 Sheets-Sheet 2

L. B. SCOTT 2,843,822

PRECISION TRANSDUCER

Filed Sept. 15, 1953

INVENTOR
Larkin B. Scott
BY
Pennie Edmonds Morton Barrows Taylor
ATTORNEYS

United States Patent Office 2,843,822
Patented July 15, 1958

2,843,822
PRECISION TRANSDUCER

Larkin B. Scott, New Canaan, Conn., assignor to The Perkin-Elmer Corporation, Norwalk, Conn., a corporation of New York Application September 15, 1953, Serial No. 380,284

19 Claims. (Cl. 323—43.5)

This invention relates to precision transducers for use in electrical apparatus and is concerned more particularly with a novel precision transducing device, by means of which a plurality of intermediate voltages may be derived from an input voltage range and variations in such intermediate voltages may be made smoothly and without interruption from one end of the range to the other. The new device is small and compact and it is inherently of high accuracy, so that the quality of its performance does not depend upon tedious and expensive methods of manufacture. In addition, the device may be constructed to have high resolution, so that it will provide a large number of increments of voltage within its range. The new transducer may be made in forms appropriate for alternating and direct current use, and, since its offers special advantages when employed with alternating current, a form suitable for such use will be illustrated and described in detail for purposes of explanation.

At the present time, electrical transducers in common use are of two main types, namely, the potentiometer and the auto-transformer. The potentiometer is essentially a resistor having a plurality of taps with respective contacts or terminals and an adjustable contact arm engageable with the terminals. A fixed reference voltage is impressed across the resistor and the voltage appearing between its lower terminal and the contact arm is then a percentage of the reference voltage equal to the ratio $R_1/R$, where R is the total resistance of the resistor and $R_1$ is the resistance between the lower terminal and the contact arm. In the use of the device, $R_1$ is frequently shunted by a low impedance, in which event the stated relationship between the voltages may not be valid, except when the resistance $R_1$ is small in comparison with the load imposed by the impedance. It is usually difficult, however, to make the resistance of the potentiometer low enough to achieve the desired condition because, for example, sufficiently low resistance would permit the flow of undesirably high currents through the device and result in a waste of power drawn from the primary voltage source. Also, the resistance wire of the potentiometer is commonly wound in a helical coil and the contact arm slides from one convolution to the next and makes contact with each convolution at one point only. As the total resistance is lowered, it is usually necessary to reduce the total turns and this reduces the number of points, which the sliding contact may engage. As a result, the device is characterized by low resolution and the steps in the output voltage may be so large as to make it impossible to adjust the device to produce a voltage acceptably close to one desired.

An auto-transformer for controlling voltage commonly takes the form of a toroidal winding of a single layer of wire upon an annular magnetic core and a moving contact or wiper, which rotates about the center of the core and contacts the turns of the winding successively. The wiper may be of such length as to span two turns, in which event the material of the wiper is of high resistance, so that large currents are avoided when the wiper shorts two turns at the same time. This shorting of turns is advantageous in that, as the wiper is moved along the winding from one turn to the next, a somewhat gradual change occurs in the voltage produced at the wiper with the result that variations in output voltage, which would occur if the wiper made contact with only one turn at a time, are smoothed out. While such devices are capable of being adjusted in smaller voltage increments than would appear to be the case from the number of turns in the winding, they do not ordinarily have the smoothness or linearity desired in some applications, as, for example, with analogue computing instruments. However, they are attractive in that they can be made to present a reasonably low output impedance.

The precision transducer of the invention may have greater resolution, smoothness, and linearity than the prior devices above mentioned. It comprises essentially a series of terminals, one of which is a reference terminal, and means for maintaining a reference voltage on the reference terminal and voltages of predetermined values relative to the reference voltage on the respective other those on the terminals are derived by means of a closed loop of distributed impedance subdivided into sections by taps at at least three substantially equally spaced points thereon and arranged so that pairs of taps can be connected in succession by switching means across successive pairs of adjacent terminals along the series. A contact is movable along the section of the impedance loop between connected taps and the output voltage is that appearing across the reference terminal and the movable contact.

A suitable form of the new device for alternating current use comprises an auto-transformer of toroidal form, which is made of a single wire conductor wound upon an annular core and having a plurality of terminals connected to taps at selected intervals along its coils. These taps provide the basic voltage levels, and voltages intermediate the basic levels are derived by means of a potentiometer winding of annular form, which has a plurality of fixed contacts connected to the winding and subdividing the latter into at least three sections comprising an impedance loop closed upon itself. The potentiometer winding is mounted adjacent the auto-transformer winding and switching means are provided for effecting a relative rotational movement of the two windings, during which the potentiometer contacts engage the auto-transformer terminals in such manner that the sections of the potentiometer winding are connected in rotation across successive pairs of terminals along the series and one section of the potentiometer is effective at all times to maintain such a connection. The potentiometer includes a rotary wiper arm movable along its winding and the arm is operated in timed relation to the relative movement of the two windings. The mode of operation is such that the section of the potentiometer winding engaged by the arm at any instant is always connected across a pair of terminals of the auto-transformer and, before the arm leaves that section and starts moving along the next section, the latter section will have been connected across the next pair of terminals along the series.

While the instrument described is of advantageous construction, it will be understood that the physical orientation of the auto-transformer terminals and of the potentiometer contacts and wiper arm, together with the mechanical arrangement of the switching means, may be varied to suit the design requirements of any particular application. Such variations do not alter the electrical characteristics of the device.

For a better understanding of the invention, reference may be made to the accompanying drawings, in which.

The instrument shown in the drawings comprises a housing 20 made of non-magnetic material and of generally cylindrical form, the housing being provided with an axial boss 21, in which is journalled a shaft 22. The shaft has an enlargement 23, which rests upon the top of boss 21, and it is held against endwise movement by the enlargement and by a collar 24, which lies outside the housing against the under surface thereof and is held in place by one or more set screws 25. At its lower end, the shaft carries a disc 26 with a knurled edge, by which the shaft can be rotated.

The housing is provided at its top with a radial flange 27 formed with an internal groove providing a seat for a gear 28, which has internal teeth and is preferably made of fiber material. A gear 29, having external teeth and preferably made of fiber material, lies within the opening through the gear 28, and the inner gear 29 is of substantially less diameter and has fewer teeth than the outer gear 28. The inner gear 29 has an axial opening receiving an enlargement 30 on shaft 22, which is eccentric to the shaft and to enlargement 23 on the shaft. The diametral pitch of the teeth on the two gears 28, 29 is the same, so that the teeth on the two gears may mesh, and the eccentricity of enlargement 30 is such that, as shaft 22 is rotated, some of the teeth on the inner gear 29 are always in mesh with teeth on the stationary outer gear 28 and the inner gear 29 rolls around the interior of the outer gear 28.

Figure 4:
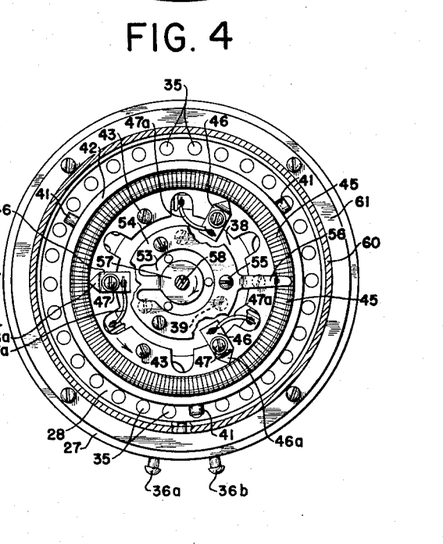
Figs. 4, 5, and 6 are sectional views on the lines 4—4, 5—5, and 6—6, respectively, of Fig. 3.
Figure 5:
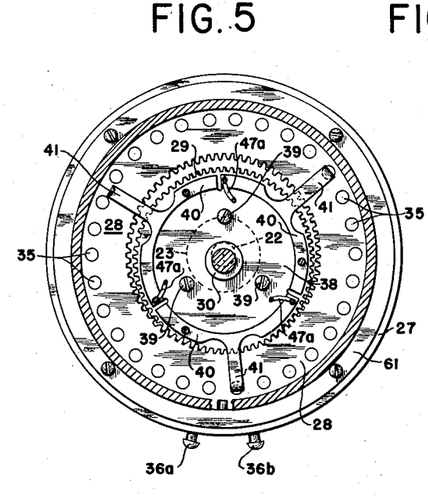
Figure 6:
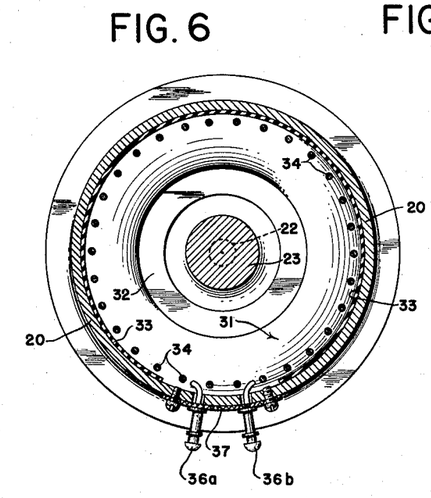

An auto-transformer 31 of toroidal form and comprising the usual core and winding rests upon a layer 32 of insulating material on the bottom of the housing and in contact with insulating material 33 lining the cylindrical wall of the housing. The winding of the auto-transformer is tapped at a plurality of points and leads 34 extend upwardly through openings through the outer gear 28 and are connected to terminals 35 exposed at the upper surface of the gear. In the instrument shown, there are thirty terminals 35 as may be seen in Figs. 4–6 inclusive. At its ends, the winding of the auto-transformer is provided with a pair of input terminals 36a, 36b, which extend through openings in the cylindrical wall of the housing 20 and are mounted in a plate 37 of insulating material secured to the outside of the housing wall and closing the openings around the terminals.

A disc 38 of insulating material rests upon the upper surface of the inner gear 29 and is secured thereto by screws 39. The disc has a peripheral channel in its upper face, in which are seated three arcuate strips 40 of sheet metal disposed end to end in spaced relation and having respective radial tongues 41, which lie 120° apart and serve as wiper contacts engageable with the terminals 35 of the auto-transformer. A cup 42 of insulating material having an opening in its bottom is mounted to overlie the periphery of disc 38 and the arcuate strips 40 and is secured to the disc by screws 43. The cup contains a ring 44 of insulating material lying against its cylindrical wall and a potentiometer winding 45 of fine wire is mounted to rest on top of ring 44 and against the inner surface of the cylindrical wall of the cup. The winding 45 is a continuous electrical path in the form of a closed loop of distributed impedance as shown in the schematic representations of Figs. 7 through 14, inclusive. The closed impedance loop is tapped by metallic contact clips 46, which are secured to the bottom of the cup by screws 47 and connected by leads 47a to respective arcuate strips 40. Each contact clip 46 has a pointed end 46a bearing against a convolution of the winding 45. The sections of the winding between the contact clips constitute conductive subdivisions or elements of a closed loop of distributed impedance.

The shaft 22 is provided at its upper end with a section 48, which extends into a metal cap 49 secured to the shaft by set screws 50 and carrying, at its upper end, a second cap 51. The cap 51 has a flat plate 52 at its top and a disc 53 of insulating material is mounted on top of plate 52. A ring 54 of sheet metal is secured to disc 53 by screws 55 and the ring has a radially projecting wiper contact 56, which engages the coils of winding 45. Ring 54 also has an inwardly extending resilient terminal 57, which engages a screw 58 forming one of the output terminals of the instrument. The screw 58 is mounted in the top plate 59 of the cover 60 of the instrument, the plate being of insulating material and preferably of glass. The lower end of the cover has a flange 61, which is grooved to receive the periphery of outer gear 28 and rests upon and is secured to flange 27 of the housing. The device is ordinarily provided with a conventional limit stop (not shown), which prevents shaft 22 from being turned continuously in one direction for more than a selected number of turns. The number of turns, through which the shaft can be rotated, depends on the construction of the device. In the instrument shown, in which there are three contact tongues 41, the shaft should be free to turn the necessary number of turns to cause each tongue to travel through one-third of the circular series of terminals 35, that is, through an arc of 120°. As will be explained later, such a movement of a tongue requires ten revolutions of shaft 22.

When the device is operated by turning the knurled disc 26 in one direction, shaft 22 is rotated with the disc, and the wiper contact 56 fast on the shaft moves over the top surface of the potentiometer winding 45. Simultaneously, the rotation of the eccentric enlargement 30 with the shaft causes the inner gear 29 to have a movement, in which its teeth are brought successively into engagement with teeth on the outer gear 28. As a result of such movement of the inner gear, while its teeth engage teeth on the stationary outer gear, the inner gear is caused to rotate on its mounting 30 in a direction opposite to the direction of rotation of shaft 22. During such movement, the inner gear carries with it the cup 42, the potentiometer winding 45 mounted on the cup, and the tongues 41 adapted to engage the terminals 35. In the instrument shown, each tongue 41 moves from one terminal 35 to the adjacent terminal in the circular series during the period, in which shaft 22 is making a complete revolution, and, since there are thirty terminals 35, each tongue advances through 12° in one direction as shaft 22 rotates 360° in the opposite direction. Because of the movement of the inner gear set forth above, each tongue describes a hypocycloidal curve with reference to a circle concentric with the center of the circular series of terminals 35. In its movement, each tongue moves in a direction generally radially of the series of terminals 35 and thus remains in contact with a terminal 35 during the period, in which shaft 22 is making more than two-thirds of a revolution, after which the tongue moves rapidly over a curved path during the remainder of the revolution of the shaft and engages the next terminal. As a consequence of such movement by the tongues, the areas of the terminals engaged by the tongues need not be so critically defined as would otherwise be the case.

The details of the inner and outer gears producing the switching action described above will vary with and be determined by the construction of the particular instrument, in which the gear combination is to be used. Thus, the diameter of the outer gear will ordinarily be restricted by limitations on the overall size of the instrument. The two gears will have teeth of suitable size and will preferably have a relatively large number of small teeth. Since the diametral pitch of the teeth on the two gears is the same, the larger diameter outer gear will have the larger number of teeth.

Figure 1:
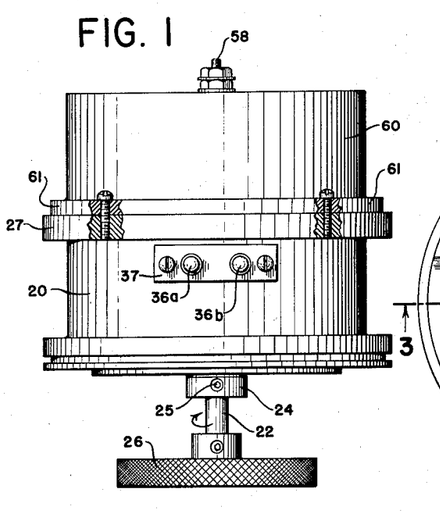
Fig. 1 is a view in side elevation, with parts broken away, of one form of precision transducer embodying the invention.
Figure 2:
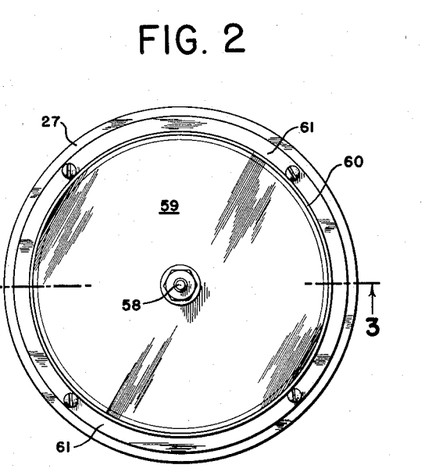
Fig. 2 is a plan view of the instrument shown in Fig. 1.
Figure 3:
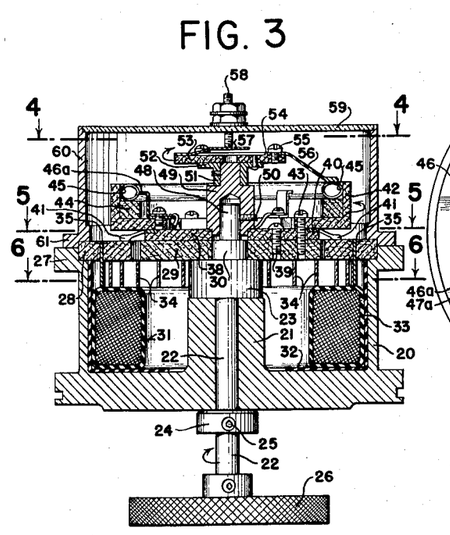
Fig. 3 is a sectional view on the line 3—3 of Fig. 2.
Figures 14, 15, 16, 17, 18:
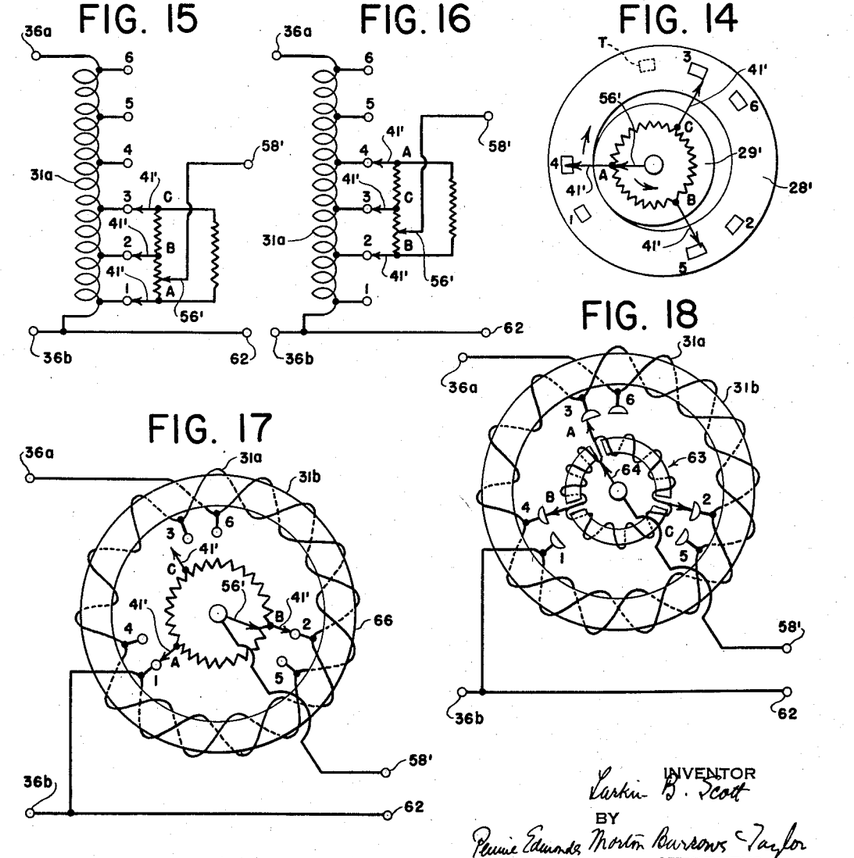
Figs. 15 and 16 are circuit diagrams illustrating the mode of operation of another form of the precision transducer of the invention.
Fig. 17 is a diagrammatic view showing the construction of the auto-transformer of the instrument.
Fig. 18 is a view similar to Fig. 17 showing a modified construction.

The mode of operation of one form of transducer of the invention will be readily understood from the wiring diagrams, Figs. 15 and 16, while the diagrams, Figs. 7–14, shows the movements of the parts of the Fig. 1 instrument. In Fig. 15, the winding of the auto-transformer 31 is indicated at 31a and is shown as having input terminals 36a, 36b and a tap on every third convolution of the winding, there being six taps with terminals marked consecutively from 1 to 6. The diagram also shows three subdivisions of distirbuted impedance, which are marked AB, BC, and CA and correspond to the sections of winding 45 between the clips 46. The points A, B, and C, where the closed winding 45 is tapped, have contacts 41' corresponding to wiper contacts 41 of the instrument.

In Fig. 15, the section AB of the closed impedance loop 45 is connected directly across terminals 1, 2 of the auto-transformer winding and the section BC is connected directly across terminals 2, 3. The section CA is connected in parallel with the sections AB and BC of the closed impedance loop 45. A movable wiper 56', which corresponds to the wiper 56 of the instrument, is shown as moving along section AB from A toward B. The wiper is connected to an output terminal 58', which corresponds to the terminal screw 58 of the instrument, and, in the diagram, there is a second output terminal 62 connected to one end of the auto-transformer winding. In the instrument shown in Fig. 1, one of the terminals 36a or 36b serves as the second output terminal.

It will be apparent from Fig. 15 that, when the terminals 36a, 36b of the auto-transformer are connected to a source of alternating voltage, there will be successive voltage drops from one tap to the next along the winding and the drops between adjacent taps will be equal. Accordingly, the voltage appearing on terminal 1 may be regarded as the reference voltage and the voltage appearing on terminal 2 then differs from the reference voltage by one increment, the voltage on terminal 3 differs from the reference voltage by two increments, and so on. With the sections AB, BC, and CA forming a closed impedance loop as shown in Fig. 15, there is a voltage change of one increment along section AB and, as contact 56' moves from A to B, the voltage across terminals 58', 62 increases until the voltage equals the reference voltage plus one increment when contact 56' is engaged with point B. When the contact reaches point B and is traveling from B to C, switching means cause the point A to be disconnected from terminal 1 and to move into contact with terminal 4. The condition then prevailing is illustrated in Fig. 16, where it will be apparent that the wiper 56' is traveling along from B toward point C and section CA is now directly connecting terminals 3, 4. Accordingly, when the wiper 56' passes points B or C, there is no break in the voltage appearing across terminals 58', 62 and the voltage across those terminals varies smoothly with the movement of wiper 56'.

It will be seen from Figs. 15 and 16 that the three sections AB, BC, and CA are connected in rotation across successive pairs of adjacent terminals along the series. Also, at least one conductive section of the closed impedance loop is effective at all times to connect a pair of terminals of the auto-transformer and the wiper contact 56' is always moving along such tapped portion.

The diagram of Fig. 17 shows the winding 31a of Figs. 15 and 16 wound upon an annular magnetic core 31b. The winding is a continuous conductor advancing counterclockwise and toroidally from a reference terminal 1 and the successive terminals 2, 3, etc. are connected to every third convolution around the body of the core and thus lie at approximately 120° intervals relative to one another. The convolutions on the second pass of the conductor about core 31b are so disposed that the successive terminals are in lagging relation to prior terminals in the series. Thus, as shown in Fig. 17, there are three terminals 1, 2, and 3, taken from the first pass of the conductor about the core and tapped to every third convolution and there are three more terminals 4, 5, and 6, taken from the second pass of the conductor about the core and tapped to every third convolution of the second pass, the terminals 4, 5, and 6 lying close to but in lagging relation to respective terminals 1, 2, and 3. For convenience in reducing the length of the leads from the taps on the winding to the terminals employed for switching purposes, the toroidal winding is of the pitch described, so that each tap lies physically close to its terminal. It will be understood that this form of winding is not necessary and the winding may be random so long as the taps are made with the required number of turns between them. The number of turns between taps should be the same for purposes of linearity but, in instruments where non-linearity is desired, there may be an unequal number of turns of the winding between adjacent taps. It will be apparent that it is not necessary that the auto-transformer be of toroidal form and it may be merely a winding on one leg of a rectangular core. It is desirable that the terminals connected to the taps of the winding be arranged in circular series, since this permits rotational operation of the switching means.

In Fig. 17, the conductive elements AB, BC, and CA are shown as connected in circular arrangement comprising a closed impedance loop and, at the taps A, B, and C, there are contacts 41', which are engageable with the terminals 1–6, incl., of the auto-transformer winding. The wiper contact 56', indicated by an arrow, is engageable with the conductive elements in rotation and is shown as moving counterclockwise along the element AB, the terminals of which are connected to terminals 1, 2 of winding 31a.

The mode of operation of the switching means of the instrument will be clear from the diagrams 7–14, incl., in which the outer gear 28' (shown as an annular member) corresponds to gear 28 and the inner gear 29' (shown as a disc) corresponds to gear 29. The outer gear 28' carries terminals connected to the auto-transformer taps and it is to be understood that, in an actual instrument, the terminals are arranged in a closed circular series throughout the extent of the gear. In the diagrams, six terminals, marked 1–6, incl., are illustrated and another terminal is indicated at T. The inner gear 29' is shown as carrying the conductive elements AB, BC, and CA connected in a closed series and the cinnected ends of the elements are provided with contacts corresponding to contacts 41 and indicated by arrows 41'. The wiper contact 56' corresponds to the wiper 56 and is movable along the conductive elements in rotation.

Figure 7:
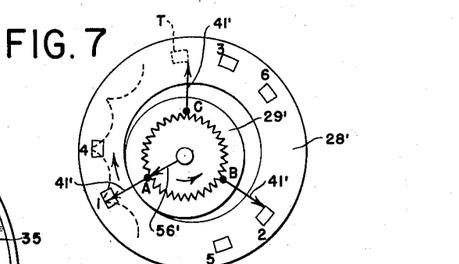
Figs. 7–14, inclusive, are diagrammatic views illustrating the mode of operation of the instrument shown in Figs. 1–6, inclusive.
Figure 8:
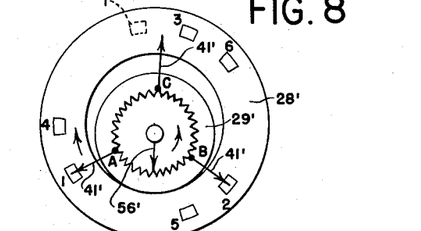
Figure 9:
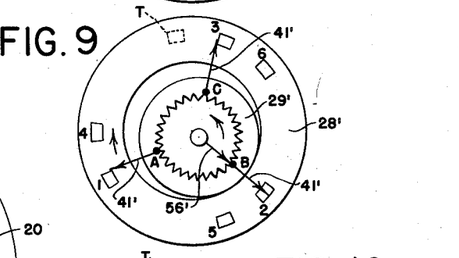
Figure 10:
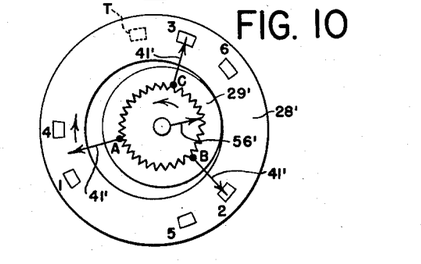
Figure 11:
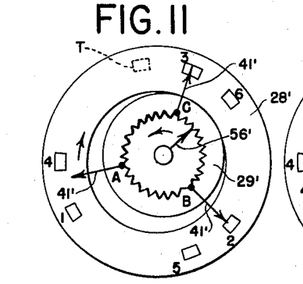

In the condition of the instrument illustrated in Fig. 7, the wiper contact 56' lies in contact with point A where elements AB and CA are connected. The contacts 41' connected to points A and B are in engagement with terminals 1 and 2, respectively, and the contact connected to point C is in position to engage terminal T. As the wiper 56' moves counterclockwise along the conductive element AC (Fig. 8), the inner gear 29' rolls along the interior of the outer gear 28' and contact 41' connected to point C moves away from terminal T toward terminal 3. As the movement of the wiper 56' and of the inner gear 29' continues, the contacts 41' connected to the points A, B, and C engage respective terminals 1, 2, and 3 at the instant that the wiper 56' reaches the point B (Fig. 9). As wiper 56' starts to move along element BC, that element remains connected by its contacts 41' across terminals 2, 3 of the auto-transformer winding, but contact 41' connected to point A moves off terminal 1 in a direction toward terminal 4 (Fig. 10).

As the movement of wiper 56' along element BC toward point C continues (Fig. 11), the contacts 41' connected to points B and C remain in contact with terminals 2, 3, respectively, and contact 41' connected to point A moves toward terminal 4, until wiper 56' reaches point C. At that instant, terminal 41' connected to point A makes contact with terminal 4, so that points A, B, and C are connected to points 4, 2, 3, respectively. As soon as wiper 56' moves away from point C along element CA (Figs. 12, 13), contact 41' connected to point B leaves terminal 2 and begins to move toward terminal 5, but the other contacts 41' connected to points A and C, respectively, remain in contact with terminals 4 and 3. When wiper 56' reaches point A (Fig. 14), the points A, B, and C are connected through their contacts 41' with terminals 4, 5, and 3, respectively, and, as wiper 56' moves past point A and starts again along element AB, points A and B remain connected through their contacts 41' with terminals 4 and 5 and the contact 41' connected with point C starts to move toward terminal 6. The sequence of operations above described is repeated as the wiper 56' moves along the conductive elements AB, BC, and CA in rotation during successive rotations of the wiper and, at every point in its travel, the wiper is in contact with a conductive element connected across a pair of adjacent terminals of the auto-transformer.

Figures 12, 13:
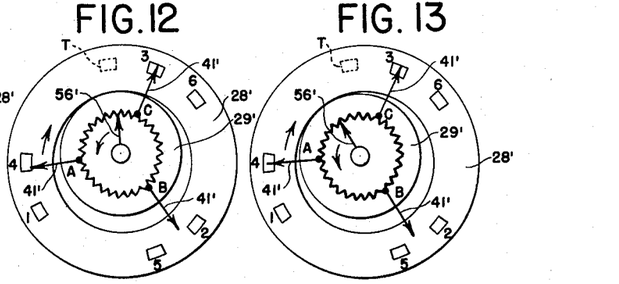

In the instrument shown, the rolling movement of the inner gear 29 along the interior of the outer gear 28 causes the contacts 41 to describe hypocycloidal curves, one of which is indicated in Fig. 7 by the dotted line representing the movement of contact 41' connected to point A. Such hypocycloidal motion of the contacts 41' causes each contact to dwell on a terminal and thus maintain contact therewith for more than two-thirds of a revolution of a shaft of the instrument, and, during the final third of the revolution of a shaft, the contact moves to the next terminal. The arrangement is such that the three contacts move from one terminal to the next in successive thirds of the revolution of the shaft. As the wiper contact 56' is moved counter-clockwise, the movement imparted to gear 29' is such that the contacts 41' advance in a clockwise direction along the series of terminals of the auto-transformer. The conductive elements AB, BC, and CA are connected in rotation across successive pairs of adjacent terminals in the series as shown in Figs. 8, 10, and 12; thus, in Fig. 8, element AB is connected across terminals 1 and 2, while, in Fig. 10, element BC is connected across terminals 2 and 3 and, in Fig. 12, element CA is connected across terminals 3 and 4. At the instant that the wiper 56' is moving from one conductive element to the next, all three elements are connected across pairs of adjacent terminals, but, as soon as the wiper has moved away from a point of connection of a pair of elements, the only element connected across a pair of terminals is the one with which the wiper is in contact. The output voltage thus varies smoothly and without breaks as the wiper is rotated, and, as the output is substantially drawn from only one conductive element connected across the auto-transformer terminals most of the time, the power loss in the instrument may be kept low.

The instrument described can be modified mechanically in various respects without altering its electrical characteristics. Thus, the inner gear 29 may be made stationary and the outer gear 28 mounted for eccentric movement, in which event, terminals 35 connected to the auto-transformer taps will be carried by the inner gear and the potentiometer winding 45 and the contact tongues 41 will be mounted on the outer gear with the tongues extending radially inwardly. With such a construction, the tongues describe epicycloidal curves.

In another modification of the mechanical features of the device, the combination of the inner and outer gears having meshing teeth and with the inner gear mounted eccentrically is replaced by a pair of concentric crown gears having different numbers of teeth and connected by a pinion moved about shaft 22 as a center by an arm fast on the shaft. With the outer gear fixed and the inner gear freely rotatable, as in the construction illustrated, the movement of the pinion about the shaft will cause the inner gear to advance on each revolution of the shaft by a distance determined by the difference in number between the teeth on the inner and outer gears. The rotation of the inner gear will be in the same direction as the rotation of the shaft and the tongues 41 on the inner gear will thus move in the same direction as the wiper contact 56. This necessitates a change in position of the taps on the auto-transformer, so that the taps 4, 5, and 6 on the second pass of the conductor about the core are in leading relation to taps 1, 2, and 3 rather than in lagging relation, as in the construction shown in Fig. 7, and the taps on each succeeding pass of the conductor lead the taps of the prior pass. With the arrangement described, the contact tongues 41 move smoothly relative to the terminals and the spacing of the tongues and the size and spacing of the terminals are chosen to insure that the conductive element engaged by wiper 56 at any instant is connected across a pair of terminals.

It is not essential that the potentiometer 45 be divided into three conductive elements. It is essential that, at the time the wiper contact 56 is moving toward the end of a conductive element, the succeeding conductive element to be engaged by the wiper will be connected across auto-transformer terminals before the wiper reaches that second element. When this requirement is fulfilled, there is no break in the voltage output as the wiper moves from one conductive element to the next and the wiper is traveling at all times along a conductive element, which is connected across a pair of adjacent elements in the series.

A modified form of the new voltage controller is illustrated diagrammatically in Fig. 18 as including a main auto-transformer made up of a winding 31a on a core 31b, the winding having input terminals 36a, 36b and taps with terminals marked 1–6, inclusive. The conductive elements of distributed impedance are sections AB, BC, and CA of the winding of an auxiliary auto-transformer 63. The auxiliary auto-transformer is mounted on an inner gear similar to gear 29 and is given a movement, which is the same as that of the connected conductive elements AB, BC, and CA in the instrument shown diagrammatically in Fig. 7. Each section of the auxiliary auto-transformer has contacts at its opposite ends, which are movable into engagement with terminals on the main auto-transformer. A wiper 64 is movable along the sections of the winding of the auxiliary auto-transformer and is connected to an output terminal 58'. The second output terminal 62 of the instrument is connected to the input terminal 36b.

In the operation of the instrument shown in Fig. 18, the rotation of the wiper 64 is accompanied by a movement of the auxiliary auto-transformer, during which the sections of its winding are connected in rotation across successive pairs of adjacent terminals connected to the winding of the main auto-transformer. The wiper 64 is shown as traveling along the section AB and, assuming that it is moving counterclockwise and that the movement of the auto-transformer is the same as that of the inner gear 29', as shown in Figs. 7–14 inclusive, the contacts B and C will move into engagement with terminals 4 and 5, respectively, before wiper 64 leaves winding section AB and moves to section BC. Also, contacts A and B will remain in engagement with terminals 3 and 4, respectively, as long as wiper 64 is moving along winding section AB. When the auxiliary auto-transformer moves as described to cause section BC of its winding to bridge terminals 4 and 5, contact A will leave terminal 3.

I claim:

1. An electrical apparatus, which comprises a series of terminals, one of which is a reference terminal, means for maintaining a reference voltage on the reference terminal and voltages of predetermined values relative to the reference voltage on the respective other terminals along the series, and means for deriving voltages intermediate those on the terminals, said means including a continuous electrical path in the form of a closed loop of distributed impedance subdivided into sections by taps at at least three substantially equally spaced points thereon, switching means for connecting pairs of adjacent taps in rotation across successive pairs of adjacent terminals along the series, and a contact movable along that section of the impedance loop between the taps on said section connected to a pair of terminals.

2. An electrical apparatus, which comprises a series of terminals, one of which is a reference terminal, means for maintaining a reference voltage on the reference terminal and voltages of predetermined values relative to the reference voltage on the respective other terminals along the series, and means for deriving voltages intermediate those on the terminals, said means including a continuous electrical path in the form of a closed loop of distributed impedance subdivided into sections by taps at at least three substantially equally spaced points thereon, switching means for connecting pairs of adjacent taps in rotation across successive pairs of adjacent terminals along the series, a contact movable along the sections in sequence, and means for operating the switching means and moving the contact to cause the contact to engage the section connected to a pair of adjacent terminals at all times.

3. An electrical apparatus, which comprises a series of terminals, one of which is a reference terminal, means for maintaining a reference voltage on the reference terminal and voltages of predetermined values relative to the reference voltage on the respective other terminals along the series, and means for deriving voltages intermediate those on the terminals, said means including a continuous electrical path in the form of a closed loop of distributed impedance subdivided into sections by taps at at least three substantially equally spaced points thereon, switching means for connecting pairs of adjacent taps in rotation across successive pairs of adjacent terminals along the series, a contact movable along the sections in succession, and means for moving the contact and operating the switching means, said moving and operating means causing the contact to at all times engage the section connected to a pair of adjacent terminals and to connect the next section in rotation across the next pair of adjacent terminals along the series before the contact engages said next section.

4. An electrical apparatus, which comprises a series of terminals, one of which is a reference terminal, means for maintaining a reference voltage on the reference terminal and voltages of predetermined values relative to the reference voltage on the respective other terminals along the series, and means for deriving voltages intermediate those on the terminals, said means including a continuous electrical path in the form of a closed impedance loop subdivided into sections by taps at at least three substantially equally spaced points thereon, switching means for connecting pairs of adjacent taps in rotation across predetermined pairs of terminals successively with at least one section effective at all times to connect a pair of terminals, a contact movable along said effective section, and means for operating the switching means and moving the contact in times relation.

5. An electrical apparatus, which comprises a plurality of main terminals arranged in a circular series, one of the terminals being a reference terminal, means for maintaining a reference voltage on the reference terminal and voltages of successively higher values on the respective other terminals in the series, and means for deriving voltages intermediate those on the terminals, said means including a group of at least three conductive elements of distributed impedance arranged and interconnected in a closed series, switching means for effecting movement of the series of terminals relative to the elements, during which the elements are connected in rotation directly across pairs of terminals successively in a predetermined order with at least one element effective at all times to connect a pair of terminals, and a contact movable along said effective element.

6. An electrical apparatus, which comprises a toroidal winding having a plurality of terminals connected to convolutions thereof and arranged in a circular series, successive terminals along the winding being spaced approximately 120°, input terminals at the ends of the winding adapted to have a voltage impressed thereon, and means for deriving voltages intermediate those appearing on the terminals, said means including three conductive elements of distributed impedance arranged and interconnected in a closed series, the elements having interconnections at approximately 120° spacings, switching means for causing a relative movement of the winding and elements, during which pairs of terminals on the winding engage pairs of interconnections to connect the elements in rotation across pairs of adjacent terminals along the winding successively with at least one element effective at all times to connect a pair of terminals on the winding, a contact movable along the elements in rotation, and means for operating the switching means and moving the contact, said means maintaining the contact engaged with said effective element.

7. An electrical apparatus, which comprises a toroidal winding with input terminals at its ends and a series of intermediate terminals, a group of at least three conductive elements of distributed impedance arranged and interconnected in a closed series, switching means for moving the group of elements to cause the elements to be connected in rotation across pairs of adjacent terminals along the winding with at least one element effective at all times to connect a pair of terminals on the winding, a contact movable along the elements in rotation, and means for operating the switching means and moving the contact, said means maintaining the contact engaged with said effective element.

8. An electrical apparatus, which comprises a toroidal winding with input terminals at its ends and a series of intermediate terminals, a potentiometer in the form of a closed loop annular winding subdivided into at least three sections by taps thereon, switching means for moving the potentiometer winding to cause the taps in rotation to move into and out of engagement with the terminals successively along the series to connect the potentiometer winding sections across successive pairs of terminals along the series, at least one section being effective at all times to connect a pair of terminals, a contact movable along the potentiometer winding, and means for operating the switching means and moving the contact, said means maintaining the contact engaged with said effective section.

9. An electrical apparatus, which comprises an autotransformer having a toroidal winding with input terminals at its ends, a series of intermediate terminals connected to spaced convolutions along the winding, and an output terminal connected to one of the input terminals, at least three conductive elements of distributed impedance arranged and interconnected in a closed series, switching means for causing a relative movement of the winding and group of elements to connect the elements in rotation between successive pairs of adjacent terminals along the winding with at least one element effective at all times to connect a pair of terminals on the winding, a wiper arm having a contact movable along the elements in rotation, a second output terminal connected to the wiper arm, said means maintaining the wiper arm contact engaged with said effective element.

10. An electrical apparatus, which comprises a base, an auto-transformer mounted on the base and having a toroidal winding with input terminals at its ends, a circular series of intermediate terminals connected to spaced convolutions along the winding, and an output terminal connected to one of the input terminals, an outer gear with internal teeth fast on the base and concentric with the series of intermediate terminals, an inner gear with external teeth and of less diameter and less teeth than the outer gear, and mounted within and in mesh with the outer gear, a shaft coaxial with the outer gear, an eccentric connection between the shaft and the inner gear, a circular closed series of at least three interconnected conductive elements of distributed impedance mounted on the inner gear concentrically therewith, the elements having interconnections engageable with said intermediate terminals and the elements being connectable in rotation across successive pairs of adjacent intermediate terminals upon rotation of the shaft, at least one element being effective at all times to connect a pair of intermediate terminals, a wiper arm mounted on the shaft and having a contact movable along the elements in succession as the shaft is rotated, the contact on the arm lying in contact with said effective element at all times, and a second output terminal connected to the wiper arm.

11. An electrical apparatus, which comprises a main auto-transformer having a toroidal winding with input terminals at its ends, a series of intermediate terminals connected to spaced convolutions along the winding, and an output terminal connected to one of the input terminals, an auxiliary auto-transformer having at least three sections, switching means for causing movement of the auxiliary auto-transformer relative to the main auto-transformer for connecting the sections of the auxiliary auto-transformer in rotation between successive pairs of adjacent terminals along the winding of the main auto-transformer with at least one section of the auxiliary auto-transformer effective at all times to connect a pair of said terminals, an arm having a contact movable along the auxiliary auto-transformer in rotation, a second output terminal connected to said contact, and means for operating the switching means and moving the arm to cause its contact to be engaged at all times with said effective section of the auxiliary auto-transformer.

12. An electrical apparatus in accordance with claim 11 wherein said auxiliary auto-transformer comprises a multiple tap toroidal winding.

13. An electrical apparatus, which comprises a main auto-transformer having a toroidal winding, with a plurality of terminals connected to convolutions thereof and arranged in a circular series, successive terminals along the winding being spaced approximately 120°, input terminals at the ends of the winding adapted to have a voltage impressed thereon, and means for deriving voltages intermediate those appearing on the terminals, said means including an auxiliary auto-transformer having three substantially equispaced taps, switching means for causing movement of the auxiliary auto-transformer taps in rotation between successive pairs of adjacent terminals along the winding of the main auto-transformer with at least one section of the auxiliary auto-transformer effective at all times to connect a pair of said terminals, an arm having a contact movable along the sections of the auxiliary auto-transformer in rotation, a second output terminal connected to said contact, and means for operating the switching means and moving the arm to cause its contact to be engaged at all times with said effective section of the auxiliary transformer.

14. An electrical apparatus, which comprises a base, a main auto-transformer mounted on the base and having a toroidal winding with input terminals at its ends, a circular series of intermediate terminals connected to spaced convolutions along the winding, and an output terminal connected to one of the terminals, an outer gear with internal teeth fast on the base and concentric with the series of intermediate terminals, an inner gear with external teeth and of less diameter and less teeth than the outer gear, and mounted within and in mesh with the outer gear, a shaft coaxial with the outer gear, an eccentric connection between the shaft and the inner gear, an auxiliary auto-transformer mounted concentrically on the inner gear, said auxiliary auto-transformer having sections between taps connectably disposed for rotational engagement with successive pairs of adjacent intermediate terminals upon rotation of the shaft, at least one section of the auxiliary auto-transformer being effective at all times to connect a pair of intermediate terminals, a wiper arm mounted on the shaft and having a contact movable along the sections of the auxiliary auto-transformer in succession as the shaft is rotated, the contact on the arm lying in contact with said effective section of the auxiliary auto-transformer at all times, and a second output terminal connected to the wiper arm.

15. An electrical switching device comprising a plurality of contacts disposed in circular array, electrically conductive means circularly disposed within said contacts and having taps adapted to be connectable with any of said contacts, a shaft rotatably mounted at the center of said circular array of contacts, having a wiper operatively connected therewith and movable along said electrically conductive means, and means responsive to the rotation of said shaft for nutating said taps in synchronism with the motion of said wiper, connecting said taps in a predetermined sequence to said contacts so that said wiper is always engaged with a portion of said conductive means connected with said contacts.

16. An electrical switching device comprising a plurality of contacts disposed in circular array, interpolating means circularly disposed within said contacts and having taps adapted to be connectable with any of said contacts, a shaft rotatably mounted at the center of said circular array of contacts, having a wiper operatively connected therewith and movable along said interpolating means, and means responsive to the rotation of said shaft for nutating said taps in synchronism with the motion of said wiper and connecting said taps in a predetermined sequence to said contacts, whereby said wiper selectively interpolates the electrical signal appearing across the contacts engaged with said taps.

17. An electrical switching device comprising a plurality of contacts disposed in circular array, interpolating means circularly disposed within said contacts and divided into sections by taps adapted to be connectable with any of said contacts, a shaft rotatably mounted at the center of said circular array of contacts, having a wiper operatively connected therewith and movable along said interpolating means, and means responsive to the rotation of said shaft for nutating said taps, connecting sections of said interpolating means with successive contacts in rotation, said wiper synchronously moving along a connected section of said interpolating means.

18. An electrical switching device comprising a plurality of contacts disposed in circular array, interpolating means circularly disposed within said contacts and divided into sections by taps adapted to be connectable with any of said contacts, a shaft rotatably mounted at the center of said circular array of contacts, having a wiper operatively connected therewith and movable along said interpolating means, and means responsive to the rotation of said shaft for nutating said taps, sequentially connecting adjacent sections of said interpolating means to said contacts with at least one section effective at all times, but never more than two sections so connected.

19. An electrical switching device comprising a plurality of contacts disposed in circular array, interpolating means circularly disposed within said contacts and divided in sections by taps adapted to be connectable with any of said contacts, a shaft rotatably mounted at the center of said circular array of contacts, having a wiper operatively connected therewith and movable along said interpolating means, and means responsive to the rotation of said shaft for nutating said taps, sequentially connecting adjacent sections of said interpolating means to said contacts, said means being synchronized with the movement of said wiper to connect two adjacent sections of said interpolating means when the wiper moves from one adjacent section to the next.

References Cited in the file of this patent

UNITED STATES PATENTS

| | | |
|---|---|---|
| 2,572,545 | Walker | Oct. 23, 1951 |
| 2,662,147 | Wilentchik | Dec. 8, 1953 |
| 2,680,790 | Jansen | June 8, 1954 |
| 2,774,934 | Gitzendanner | Dec. 18, 1956 |

FOREIGN PATENTS

| | | |
|---|---|---|
| 53,301 | France | Jan. 22, 1945 |
| 336,046 | Italy | Feb. 12, 1936 |

UNITED STATES PATENT OFFICE

CERTIFICATE OF CORRECTION

Patent No. 2,843,822                          July 15, 1958

Larkin B. Scott

It is hereby certified that error appears in the printed specification of the above numbered patent requiring correction and that the said Letters Patent should read as corrected below.

Column 2, line 21, following the word "other" insert -- terminals along the series. The voltage intermediate --; column 5, line 23, for "distirbuted" read -- distributed --.

Signed and sealed this 8th day of March 1960.

(SEAL)
Attest:

KARL H. AXLINE
Attesting Officer

ROBERT C. WATSON
Commissioner of Patents